(12) United States Patent
Wu et al.

(10) Patent No.: US 11,366,006 B2
(45) Date of Patent: Jun. 21, 2022

(54) WEIGHING SENSOR AND ELECTRONIC BALANCE HAVING PHOTOELECTRIC POSITION SENSOR WITH INTEGRATED STOP STRUCTURE

(71) Applicants: Mettler Toledo Instrument (Shanghai) Company Limited, Shanghai (CN); Mettler-Toledo International Trading (Shanghai) Co., Ltd., Shanghai (CN)

(72) Inventors: Chao Wu, Shanghai (CN); Baohui Liu, Shanghai (CN); Chun Yang, Shanghai (CN)

(73) Assignees: Mettler Toledo Instrument (Shanghai) Company Limited, Shanghai (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 103 days.

(21) Appl. No.: 16/764,512

(22) PCT Filed: Nov. 30, 2018

(86) PCT No.: PCT/CN2018/118398
§ 371 (c)(1),
(2) Date: May 15, 2020

(87) PCT Pub. No.: WO2019/109857
PCT Pub. Date: Jun. 13, 2019

(65) Prior Publication Data
US 2020/0386606 A1 Dec. 10, 2020

(30) Foreign Application Priority Data

Dec. 4, 2017 (CN) .......................... 201711262640.X (51) Int. Cl.
*G01G 7/02* (2006.01)

(52) U.S. Cl.
CPC ...................................... *G01G 7/02* (2013.01)

(58) Field of Classification Search
CPC ......................................................... G01G 7/02
See application file for complete search history.

(56) References Cited

U.S. PATENT DOCUMENTS 4,802,541 A * 2/1989 Bator ....................... G01G 7/04
177/189
4,825,968 A * 5/1989 Maaz ....................... G01G 7/04
177/212

(Continued)

FOREIGN PATENT DOCUMENTS

CN 203464985 U 3/2014
CN 204854905 U 12/2015

(Continued)

*Primary Examiner* — Natalie Huls
(74) *Attorney, Agent, or Firm* — Standley Law Group LLP; Jeffrey S. Standley; Stephen L. Grant (57) ABSTRACT

A weighing sensor is provided for an electronic balance. A weighing unit of the weighing sensor has a load-receiving portion, a fixing portion, and parallel guiding members that connect the load-receiving and fixing portions A lever, with a first end connected to the load-receiving portion, is located between the parallel guiding members and the fixing portion. A lower portion of a photoelectric position limiting block is connected to the fixing portion, and an upper portion thereof has a limiting structure. A tail end portion of a second end of the lever is disposed in the limiting structure, limiting its deviation. The photoelectric position limiting block has a photoelectric position sensor and a stop structure for limiting deviation of the tail end portion.

13 Claims, 6 Drawing Sheets

(56) References Cited

U.S. PATENT DOCUMENTS

| | | | |
|---|---|---|---|
| 7,780,579 B2* | 8/2010 | Mueller | G01G 7/04 482/62 |
| 9,086,315 B2* | 7/2015 | Metzger | G01G 23/48 |
| 9,360,362 B2* | 6/2016 | Metzger | G01G 21/26 |
| 9,927,284 B2 | 3/2018 | Graf | |
| 2014/0374173 A1 | 12/2014 | Naito et al. | |
| 2016/0033320 A1* | 2/2016 | Graf | G01G 7/02 177/21 OR |
| 2017/0241846 A1* | 8/2017 | Burkhard | G01G 21/244 |
| 2021/0199487 A1* | 7/2021 | Wu | G01G 21/244 |

FOREIGN PATENT DOCUMENTS

| | | |
|---|---|---|
| CN | 106197624 A | 12/2016 |
| CN | 207556637 U | 6/2018 |
| DE | 202005002369 U1 | 5/2005 |

\* cited by examiner

WEIGHING SENSOR AND ELECTRONIC BALANCE HAVING PHOTOELECTRIC POSITION SENSOR WITH INTEGRATED STOP STRUCTURE

FIELD OF THE INVENTION

The present invention relates to the field of electronic balances, particularly to a weighing sensor used in an electronic balance.

THE RELATED ART

In daily life, electronic balances are used to produce electromagnetic force to balance the weight of an object. The electronic balances are characterized by accurate and reliable weighing, and fast and clear display, and have an automatic detection system, a simple automatic calibration device, an overload protection device, etc.

At present, weighing sensor used in electronic balances mainly bases on the principles of electromagnetic force compensation, and the lever will have a deviation when loading; therefore, there will be a stop structure on the electromagnetic force compensation sensor for preventing the tail portion of the lever from being offset to a relatively deviation. Correspondingly, a photoelectric position sensor is used to detect changes in luminous flux. The common photoelectric position sensors and stop structures for preventing the tail portion of the lever from being offset to a relatively deviation are two different components. As a result, there are so many parts on the sensor, the assembly process is relatively complicated, and the cost is relatively high.

In order to solve the above-mentioned problems, the present invention provides a weighing sensor which integrates a photoelectric position sensor with a stop structure for preventing the tail portion of the lever from being offset to a relatively deviation.

SUMMARY

The Object of the present invention is to provide a system and method for performing weighing at any loading position in a horizontal state and an inclined state, thereby improving the weighing accuracy and improving the efficiency of the staff.

The technical problem to be solved by the present invention is to provide a weighing sensor and an electronic balance, in order to overcome the defects in the prior art that there are multiply parts in the weighing sensor, the complicated assembly process, high cost and the like.

The above-mentioned technical problems are solved in the present invention by the following technical solution:

A weighing sensor used in an electronic balance, wherein the weighing sensor comprises:

a weighing unit comprising a load-receiving portion, a fixing portion, parallel guiding, members for connecting the load-receiving portion and the fixing portion together, a lever, wherein one end of the lever is connected to the load-receiving portion, and the lever is disposed between the parallel guiding members and the fixing portion; and a photoelectric position limiting block, wherein a lower portion of the photoelectric position limiting block is connected to the fixing portion, a limiting structure is formed on the upper portion of the photoelectric position limiting block is provided with, and a tail end portion of the other end of the lever is disposed in the limiting structure to limit an deviation of the tail end portion of the other end of the lever.

According to an embodiment of the present invention, the weighing sensor further comprises a photoelectric transmitting and receiving board, which is fixed on the outside surface of the photoelectric position-limiting block.

According to an embodiment of the present invention, one end of the fixing portion extending forwardly to the load-receiving portion and a gap is formed between the fixing portion and the load-receiving portion, and a mounting portion is disposed on the end of the fixing portion; and an elliptical through hole is formed on the lower portion of the photoelectric position limiting block, and the photoelectric position limiting block is fixed to the fixing portion by means of a fixing member passing through the elliptical hole and the mounting portion.

According to an embodiment of the present invention, the mounting portion of the fixing portion is provided as an inwardly-extending mounting groove, the mounting groove is shaped to match the shape of the lower portion of the photoelectric position limiting block, and the lower portion of the photoelectric position limiting block is embedded into and fixedly connected to the mounting groove.

According to an embodiment of the present invention, an inwardly-extending mounting groove is formed on the outside surface of the lower portion of the photoelectric position limiting block, wherein the elliptical hole is located in the mounting groove, and the mounting groove and the limiting structure are located on the same outside surface of the photoelectric position limiting block; and the mounting portion of the fixing portion is provided as an outwardly-projecting protrusion, wherein the protrusion is embedded into and fixedly connected to the mounting groove.

According to an embodiment of the present invention, the limiting structure is a longitudinal through notch, which is disposed between the upper end outside surface and a corresponding lower end outside surface of the photoelectric position-limiting block.

According to an embodiment of the present invention, the tail end portion of the other end of the lever is separated by a slot, the tail end portion is at least partially disposed in the limiting structure, an upper end surface of the tail end portion of the lever is matched with an upper surface of the limiting structure, and a lower end surface of the tail end portion of the lever is matched with a lower surface of the limiting structure.

According to an embodiment of the present invention, when the electronic balance is in the power-on state and in stable equilibrium, then there is a gap provided between the upper surface of the tail end portion of the lever and the upper surface of the limiting structure; and between the lower end surface of the tail end portion of the lever and the lower surface of the limiting structure.

According to an embodiment of the present invention, the limiting structure and the photoelectric position-limiting block are of an integral structure.

The present invention further provides an electronic balance, comprising the weighing sensor as described above.

The positive and progressive effects of the present invention lie in that:

The weighing sensor and the electronic balance comprising of the present invention, the photoelectric position sensor and the stop structure for preventing the tail portion of the lever from being offset to a relatively deviation are both arranged on the photoelectric position limiting block to form an integral structure, which may be formed either by machining or by die casting followed by machining. By means of such a structural arrangement, the weighing sensor has many advantages, such as a simple structure, being convenient to assemble, and low costs.

BRIEF DESCRIPTION OF THE DRAWINGS

The above-mentioned and other features, properties and advantages of the present invention will become more apparent from the following description of embodiments with reference to the accompany drawings, and same reference numerals denote same features throughout the drawings, in which.

DETAILED DESCRIPTION OF EMBODIMENTS

To make the above objects, features and advantages of the present invention more obvious and easy to understand, the present invention will be further described in detail below in conjunction with the accompanying drawings and particular embodiments.

Embodiments of the present invention will now be described in detail with reference to the accompanying drawings. Reference now will be made in detail to preferred embodiments of the present invention, examples of which are illustrated in the accompanying drawings. The same reference numerals used in all the figures denote identical or similar parts wherever possible.

Furthermore, although the terms used in the present invention are selected from well-known common terms, some of the terms mentioned in the description of the present invention may have been selected by the applicant according to his or her judgement, and the detailed meaning thereof is described in the relevant section described herein.

Furthermore, the present invention should be understood, not simply by the actual terms used but also by the meanings encompassed by each term.

Figure 1:
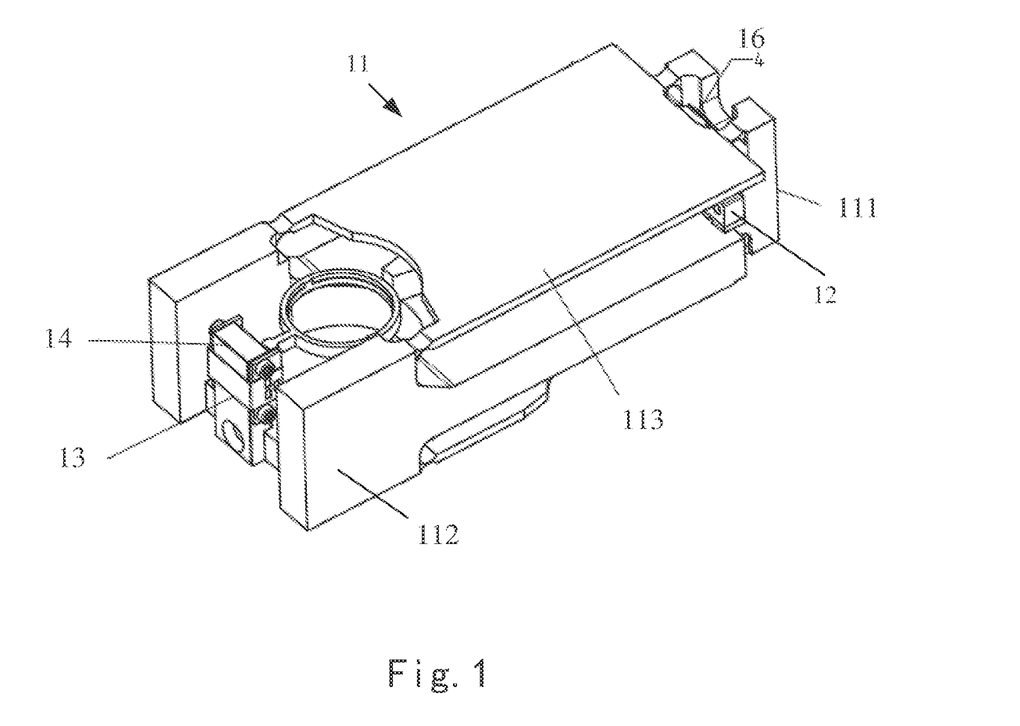
FIG. 1 is a perspective view of a weighing sensor of the present invention.
Figure 2:
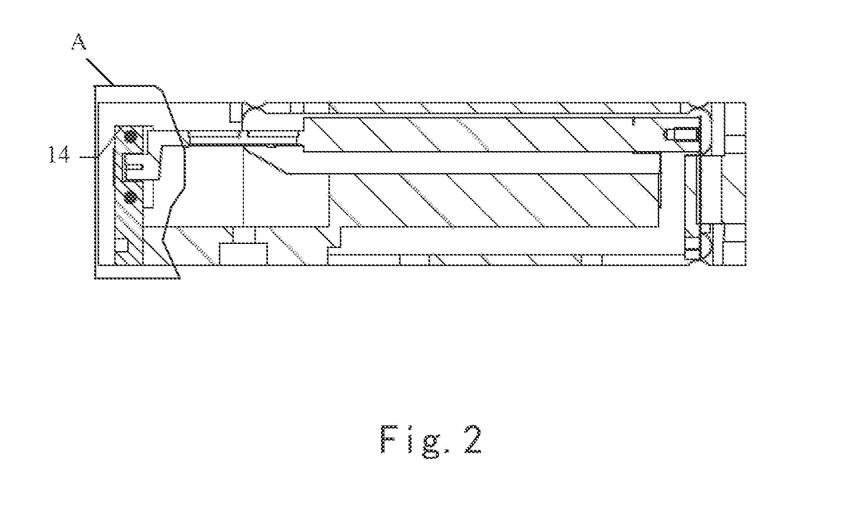
FIG. 2 is a sectional view of the weighing sensor of the present invention.
Figure 3:
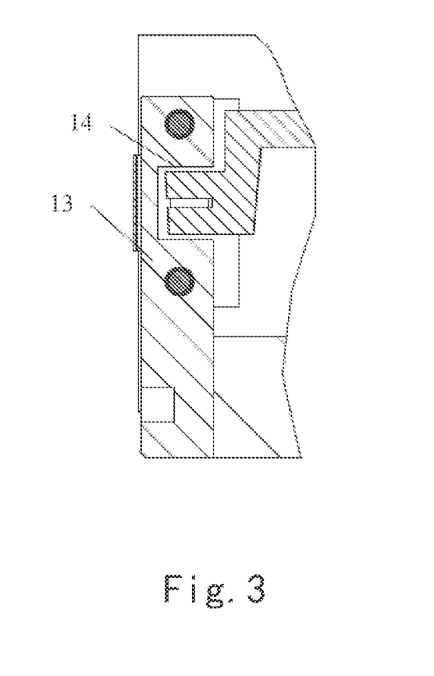
FIG. 3 is an enlarged view of the portion A in FIG. 2.

FIG. 1 is a perspective view of a weighing sensor of the present invention. FIG. 2 is a sectional view of the weighing sensor of the present invention. FIG. 3 is an enlarged view of the portion A in FIG. 2.

As shown in FIGS. 1 to 3, the present invention discloses an electronic balance, which comprises a weighing sensor 10. The weighing sensor 10 comprises a weighing unit 11, a lever 12 and a photoelectric position sensor. The weighing unit 11 comprises a load-receiving portion 111, a fixing portion 112, and parallel guiding members 113 for connecting the load-receiving portion 111 and the fixing portion 112 together. One end of the lever 12 is connected to the load-receiving portion 111, and the lever 12 is disposed between the parallel guiding members 113 and the fixing portion 112. The photoelectric position sensor is disposed to the other end of the lever 12.

Figure 4:
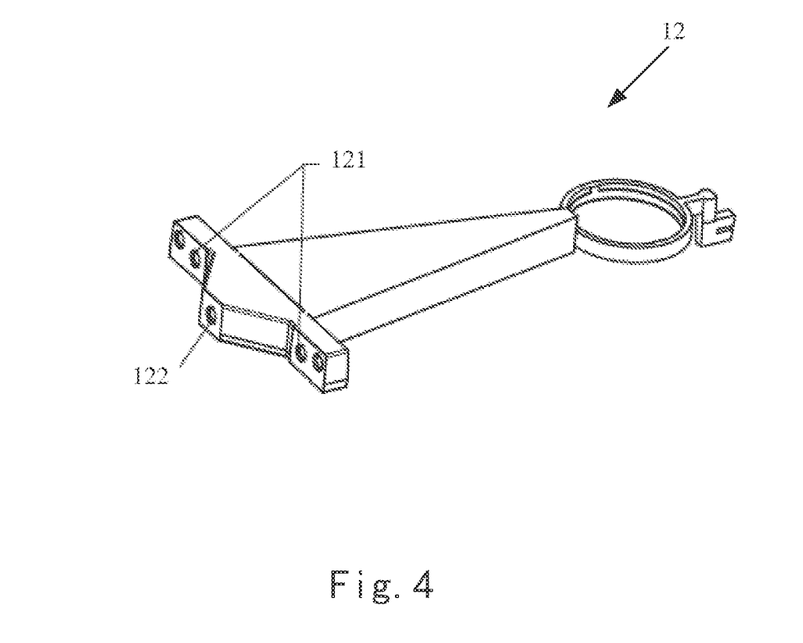
FIG. 4 is a perspective view of a lever in the weighing sensor of the present invention.
Figure 5:
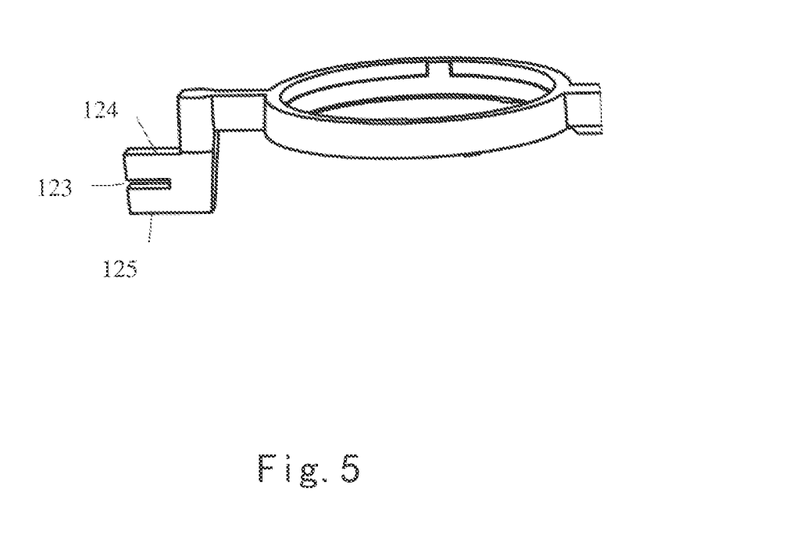
FIG. 5 is a structural schematic view of the other end of the lever in the weighing sensor of the present invention.
Figure 6:
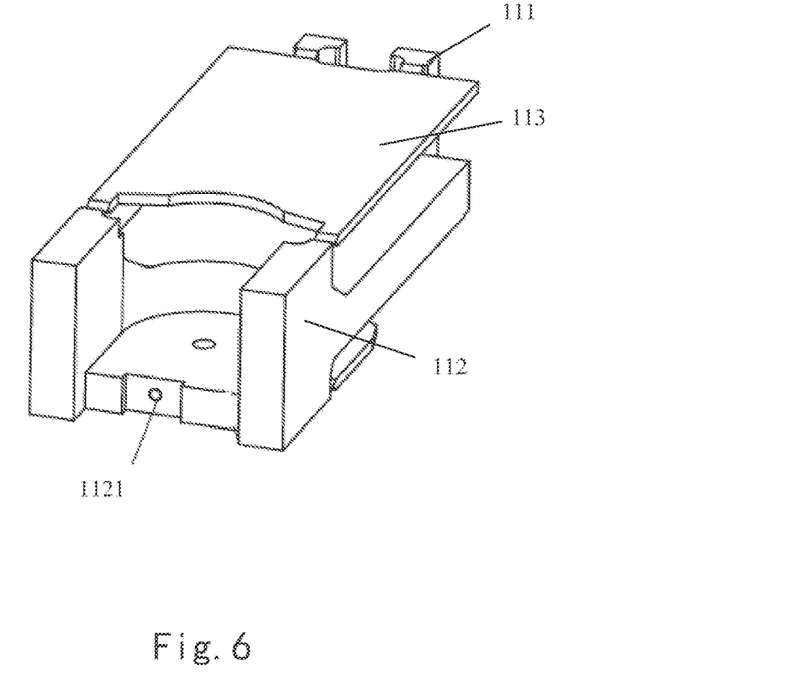
FIG. 6 is a perspective view of an embodiment of a weighing unit in the weighing sensor of the present invention.
Figure 7:
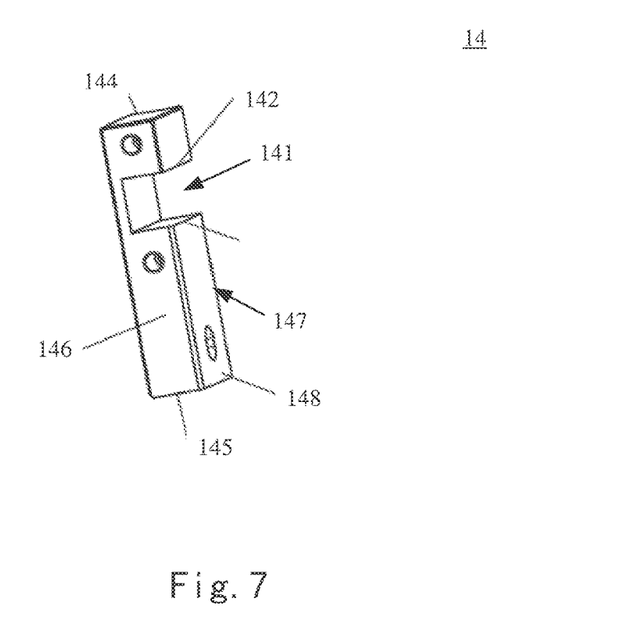
FIG. 7 is a perspective view of an embodiment of a photoelectric position-limiting block in the weighing sensor of the present invention.

FIG. 4 is a perspective view of a lever in the weighing sensor of the present invention. FIG. 5 is a structural schematic view of the other end of the lever in the weighing sensor of the present invention. FIG. 6 is a perspective view of an embodiment of a weighing unit in the weighing sensor of the present invention. FIG. 7 is a perspective view of an embodiment of a photoelectric position-limiting block in the weighing sensor of the present invention.

As shown in FIGS. 4 to 7, the photoelectric position sensor assembly in The weighing sensor in this embodiment comprises a photoelectric transmitting and receiving plate 13 and a photoelectric position limiting block 14, wherein a lower portion of the photoelectric position limiting block 14 is fixedly connected to the fixing portion 112, and a limiting structure 141 is formed on the upper portion of the photoelectric position limiting block. A tail end portion of the other end of the lever 12 is disposed in the limiting structure to limiting a deviation of the tail end portion of the other end of the lever 12. The photoelectric transmitting and receiving plate 13 is fixed on the outside surface of the photoelectric position-limiting block 14.

One end of the fixing portion 112 extending forwardly to the load-receiving portion 111 and a gap is formed between the fixing portion 112 and the load-receiving portion 111, and an end portion of the other end of the fixing portion is provided with a mounting portion 1121 for mounting the photoelectric position-limiting block 14. Specifically, the lower portion (a left end surface 149 as shown in FIG. 7) of the photoelectric position limiting block 14 is provided with an elliptical through hole b, and the photoelectric position limiting block 14 is fixed to the fixing portion 112 by means of a fixing member passing through the elliptical hole b and the mounting portion 1121.

As shown in FIGS. 6 and 7, in an embodiment, the mounting portion 1121 of the fixing portion 112 is provided as an inwardly-extending mounting groove, the mounting groove is shaped to match the lower portion of the photoelectric position limiting block 14, and the lower portion of the photoelectric position limiting block 14 is embedded into and fixedly connected to the mounting groove, so that a fixed connection is formed between the photoelectric position limiting block 14 and the fixing portion 112, which can effectively prevent the limiting block from tilting during the assembly process of the weighing sensor.

Figure 8:
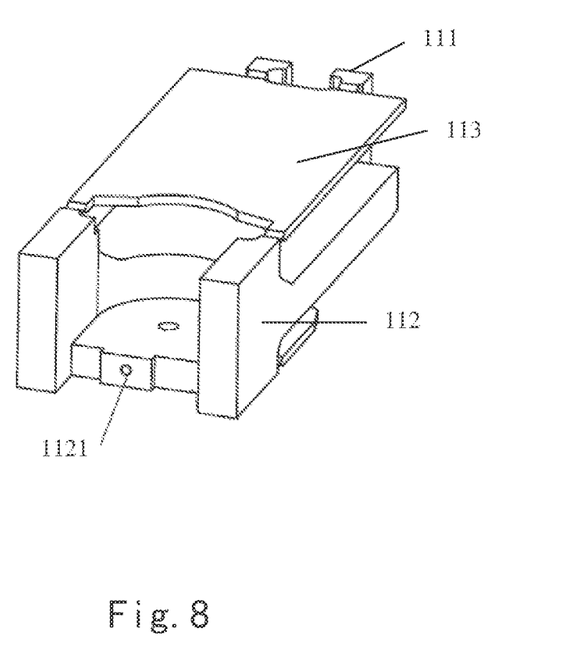
FIG. 8 is a perspective view of another embodiment of the weighing unit in the weighing sensor of the present invention.
Figure 9:
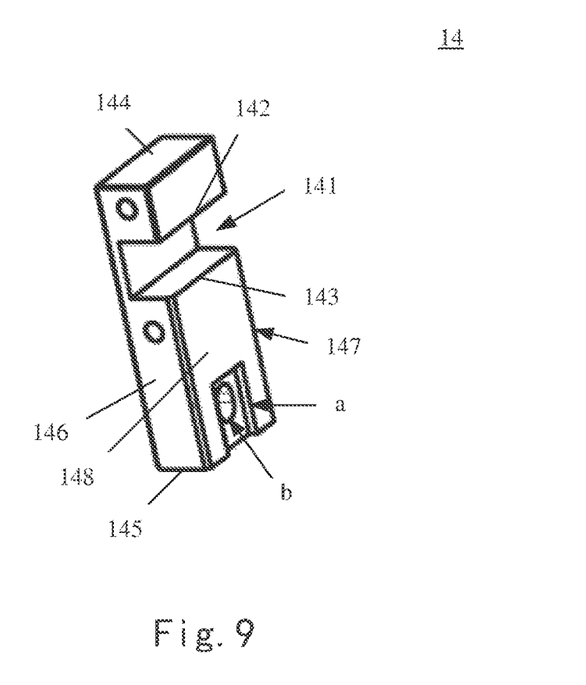
FIG. 9 is a perspective view of another embodiment of the photoelectric position-limiting block in the weighing sensor of the present invention.

FIG. 8 is a perspective view of another embodiment of the weighing unit in the weighing sensor of the present invention. FIG. 9 is a perspective view of another embodiment of the photoelectric position-limiting block in the weighing sensor of the present invention.

As shown in FIGS. 8 and 9, in another embodiment, the connection mode between the fixing portion 112 and the photoelectric position limiting block 14 may also be in another form, for example, an inwardly-extending mounting groove is formed on the outside surface of the lower portion of the photoelectric position limiting block 14, and the elliptical hole b is located in the mounting groove a. Here, the mounting groove a and the limiting structure 141 are located on the same outside surface of the photoelectric position-limiting block 14. The mounting portion 1121 of the fixing portion 112 is provided as an outwardly-projected protrusion which is embedded into and fixedly connected to the mounting groove a. In this way, a fixed connection can be formed between the photoelectric position limiting block 14 and the fixing portion 112, which can effectively prevent the limiting block from tilting during the assembly process of the weighing sensor.

Figure 10:
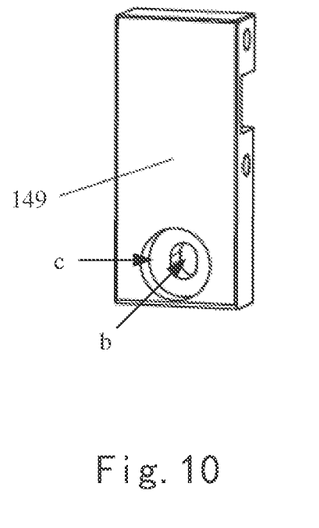
FIG. 10 is a schematic view of a left end face of the photoelectric position-limiting block in the weighing sensor of the present invention.
Figure 11:
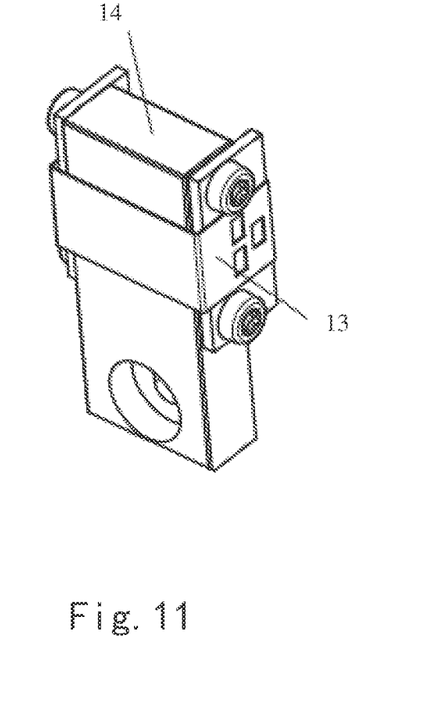
FIG. 11 is a perspective view of a photoelectric position sensor assembly in the weighing sensor of the present invention.

FIG. 10 is a schematic view of a left end surface of the photoelectric position-limiting block 14 in The weighing sensor of the present invention. FIG. 11 is a perspective view of a photoelectric position sensor in the weighing sensor of the present invention.

As shown in FIGS. 10 and 11, further, an inwardly-extending groove c is further provided on the outside surface (a left end surface 149 as shown in FIG. 10) of the lower portion of the photoelectric position limiting block 14, wherein the groove c is located on the surface (a right end surface 148 as shown in FIG. 9), opposite the limiting structure 141, of the photoelectric position limiting block 14, and the elliptical hole h is located in the groove c. The corresponding right end face 148 is fixedly connected to the first mounting portion 1121 of the fixing portion 112, and the photoelectric position limiting block 14 can moves up and down to adjust the position by means of the elliptical hole b.

Preferably, the limiting structure 141 is a longitudinal through notch, which is provided between an upper end surface 144 and a corresponding lower end surface 145 of the photoelectric position-limiting block 14, The upper surface 142 and the lower surface 143 corresponding to the notch form a limiting structure 141. Preferably, the limiting structure 141 and the photoelectric position-limiting block 14 may be provided as an integral structure.

Further preferably, the lever 12 comprises a first mounting portion 121 for connecting a fulcrum members and a second mounting portion 122 for connecting a load-transmitting member 16 at one end, and the tail end portion of the other end corresponding to the one end is separated by a slot 123, wherein the tail end portion is at least partially disposed in the limiting structure 141. In particular, an upper end surface 124 of the tail end portion of the lever is matched with the upper surface 142 of the limiting structure 141, and a lower end surface 125 of the tail end portion of the lever is matched with the lower surface 143 of the limiting structure 141.

After the load is loaded on the load-receiving portion 111, load-transmitting member 16 transmits the force to the lever 12. The lever 12 loses balance, and after the force is enlarged by a long arm of the lever 12, the slot 123 on the tail end of the lever 12 deviates from the original balance position. The photoelectric transmitting and receiving plate 13 detects that the luminous flux passing through the slot 123 on the lever 12 changes, and thus feeds same back to a weighing sensor circuit device to cause the weighing sensor circuit device to generate a corresponding compensating current. At this time, the current flows through a coil located at the long arm end of the lever, and the coil produces a compensating force (or referred to as a balance force) in a fixed magnetic field, so that the lever 12 returns to the balance state again, that is, the slot 123 returns to the balance position. The actual weight of the loaded load can be obtained by performing a series of data collection and data processing on the compensating current by means of a circuit part of the electronic balance.'

When the lever 12 receives the load and has deviation, the limiting structure is required to prevent the lever 12 from being excessively deviate, so as to achieve the purpose of protecting the lever 12, the fulcrum members (not shown in the figures), and the load-transmitting member 16. When the lever 12 has deviation due to the reception of a load, the limiting structure is required to prevent the lever 12 from being excessively deviated, so as to achieve the purpose of protecting the lever, the fulcrum members, and the load-transmitting member 16. The limiting structure and the photoelectric position limiting block 14 are of an integral structure, which may be integrally formed by machining, or may be formed by die casting followed by machining into the integral structure, and by means of such an arrangement, the photoelectric position sensor assembly has a simple structure, is convenient to assemble, and has low costs.

When the electronic balance is in a power-on state of stable equilibrium, there is a gap between the upper end surface a first fitting face 124) of the tail end portion of the lever 12 and the upper surface 142 of the limiting structure 141 of the photoelectric position limiting block 14, and there is a gap between the lower end surface (i.e., a second fitting face 125) of the tail end portion of the lever 12 and the lower surface 143 of the limiting structure 141 of the photoelectric position limiting block 14.

When the lever 12 deviate upward due to the effect of the load, the upper end surface of the tail end portion of the lever 12 will hit the upper surface 142 of the limiting structure 141 of the photoelectric position-limiting block 14. The upper surface 142 of the limiting structure 141 acts as a stopper for the lever 12, thereby protecting the lever 12, the fulcrum members and the load-transmitting member 16.

When the lever 12 deviate downward due to the effect of the load, the lower end surface (i.e., the second fitting surface 125) of the tail end portion of the lever 12 will hit the lower surface 143 of the limiting structure 141 of the photoelectric position limiting block 14, and the lower surface 143 of the limiting structure 141 acts as a stop for the lever 12, thereby protecting the lever 12, the fulcrum members and the load-transmitting member 16.

Furthermore, the tail end portion of the lever 12 is at least partially disposed in the limiting structure 141 of the photoelectric position-limiting block 14, and the front end surface 146 and the corresponding rear end surface 147 of the photoelectric position limiting block 14 are mounted with the photoelectric transmitting and receiving plate 13 together.

In summary, in The weighing sensor and the electronic balance comprising same of the present invention, the photoelectric position sensor and the stop structure for preventing the tail portion of the lever from being offset to a relatively deviation are both arranged on the photoelectric position limiting block to form an integral structure, which may be formed either by machining or by die casting followed by machining. By means of such a structural arrangement, the weighing sensor has many advantages, such as a simple structure, being convenient to assemble, and low costs.

While the particular embodiments of the present invention have been described above, a person skilled in the art should understand that these are merely illustrative, and that the scope of protection of the present invention is defined by the appended claims, Various alterations or modifications to these embodiments can be made by a person skilled in the art without departing from the principle and substance of the present invention; however, these alterations and modifications all fall within the scope of protection of the invention.

What is claimed is:

1. A weighing sensor used in an electronic balance, the weighing sensor comprising:
a weighing unit comprising
a load-receiving portion,
a fixing portion, having an end that extends towards the load-receiving portion, leaving a gap between the fixing portion and the load-receiving portion; and
a pair of parallel guiding members that connect the load-receiving portion and the fixing portion;
a lever, disposed between the parallel guiding members and the fixing portion, with a first end of the lever connected to the load-receiving portion;
a photoelectric position limiting block, having a lower portion connected to the fixing portion, with an elliptical through-hole formed in the lower portion, and having an upper portion with a limiting structure formed thereon, such that a tail portion of a second end of the lever is disposed in the limiting structure to limit a deviation of the tail portion;
a photoelectric transmitting and receiving board, which is fixed on an outside surface of the photoelectric position-limiting block;
a mounting portion, disposed on the end of the fixing portion; and
a fixing member that passes through the elliptical hole and the mounting portion to fix the photoelectric position limiting block to the fixing portion.

2. The weighing sensor of claim 1, wherein:
the mounting portion of the fixing portion is an inwardly-extending mounting groove that is shaped to match the shape of the lower portion of the photoelectric position limiting block, and
the lower portion of the photoelectric position limiting block is embedded into and fixedly connected to the mounting groove.

3. The weighing sensor of claim 1, further comprising:
an inwardly-extending mounting groove, formed on the outside surface of the lower portion of the photoelectric position limiting block, with the elliptical hole located in the mounting groove, the mounting groove and the limiting structure both located on the same outside surface of the photoelectric position limiting block; and
the mounting portion of the fixing portion is an outwardly-projecting protrusion, which is embedded into and fixedly connected to the mounting groove.

4. An electronic balance, comprising:
a weighing sensor according to claim 1.

5. A weighing sensor used in an electronic balance, the weighing sensor comprising:
a weighing unit comprising
a load-receiving portion,
a fixing portion, and
a pair of parallel guiding members that connect the load-receiving portion and the fixing portion;
a lever, disposed between the parallel guiding members and the fixing portion, with a first end of the lever connected to the load-receiving portion; and
a photoelectric position limiting block, a lower portion thereof connected to the fixing portion, an upper portion thereof having, to act as a limiting structure, a longitudinal through notch that is disposed between an outside surface of the upper portion and a corresponding lower portion of the photoelectric position-limiting block, with a tail portion of a second end of the lever disposed in the limiting structure to limit a deviation of the tail portion;
wherein a slot separates the tail end portion of the second end of the lever into an upper end surface and a lower end surface, so that when the tail end portion is at least partially disposed in the limiting structure, the upper end surface matched with an upper surface of the limiting structure, and the lower end surface matched with a lower surface of the limiting structure.

6. The weighing sensor of claim 5, further comprising:
a photoelectric transmitting and receiving board, which is fixed on an outside surface of the photoelectric position-limiting block.

7. The weighing sensor of claim 6, further comprising:
a mounting portion is disposed on one end of the fixing portion that extends towards the load-receiving portion, where a gap exists between the fixing portion and the load-receiving portion;
an elliptical through hole is formed on a lower portion of the photoelectric position limiting block; and
a fixing member that passes through the elliptical hole and the mounting portion fixes the photoelectric position limiting block to the fixing portion.

8. The weighing sensor of claim 5, wherein:
when the electronic balance is in the power-on state and in stable equilibrium, then:
a gap is provided between the upper surface of the tail end portion of the lever and the upper surface of the limiting structure; and
a gap is provided between the lower end surface of the tail end portion of the lever and the lower surface of the limiting structure.

9. The weighing sensor of claim 8, wherein:
the limiting structure and the photoelectric position limiting block are of an integral structure.

10. The weighing sensor of claim 5, wherein:
the limiting structure and the photoelectric position limiting block are of an integral structure.

11. An electronic balance, comprising:
a weighing sensor according to claim 5.

12. The weighing sensor of claim 5, wherein:
the mounting portion of the fixing portion is an inwardly-extending mounting groove that is shaped to match the shape of the lower portion of the photoelectric position limiting block, and
the lower portion of the photoelectric position limiting block is embedded into and fixedly connected to the mounting groove.

13. The weighing sensor of claim 5, further comprising:
an inwardly-extending mounting groove, formed on the outside surface of the lower portion of the photoelectric position limiting block, with the elliptical hole located in the mounting groove, the mounting groove and the limiting structure both located on the same outside surface of the photoelectric position limiting block; and
the mounting portion of the fixing portion is an outwardly-projecting protrusion, which is embedded into and fixedly connected to the mounting groove.

* * * * *